United States Patent [19]

Yamada et al.

[11] Patent Number: 4,839,755

[45] Date of Patent: Jun. 13, 1989

[54] ROTARY HEAD TYPE DIGITAL SIGNAL REPRODUCING APPARATUS WITH DIFFERENT MODES AND TRACKING CONTROL

[75] Inventors: Yasuhiro Yamada, Yokosuka; Shoji Ueno, Zama; Shiro Yoshida, Maebashi, all of Japan

[73] Assignee: Victor Company of Japan, Ltd., Japan

[21] Appl. No.: 91,085

[22] Filed: Aug. 31, 1987

[30] Foreign Application Priority Data

Sep. 5, 1986 [JP] Japan ................................. 61-209243
Oct. 2, 1986 [JP] Japan ................................. 61-234961

[51] Int. Cl.$^4$ .................... G11B 5/584; G11B 15/467
[52] U.S. Cl. ......................................... 371/38; 360/32; 360/70; 360/73.13; 360/77.14
[58] Field of Search ............................. 360/9.1–10.3, 360/18, 19.1, 70, 73, 77, 32, 8, 75

[56] References Cited

U.S. PATENT DOCUMENTS 3,470,315  9/1969  Kihara .
4,075,666  2/1978  Lomax et al. .
4,594,621  6/1986  Noguchi et al. ....................... 360/77
4,730,222  3/1988  Schauffle ................................ 360/8
4,739,420  4/1988  Odaka et al. ........................... 360/77

FOREIGN PATENT DOCUMENTS 0137346  4/1985  European Pat. Off. .
0178906  4/1986  European Pat. Off. .
0184190  6/1986  European Pat. Off. .

OTHER PUBLICATIONS

Patent Abstracts of Japan, vol. 9, No. 83 (P-348), [1806], 12/4/85, Ozaki.

Primary Examiner—Alan Faber
Assistant Examiner—Steven R. Garland
Attorney, Agent, or Firm—Andrus, Sceales, Starke & Sawall

[57] ABSTRACT

A rotary head type digital signal reproducing apparatus plays a magnetic tape which is pre-recorded with a tracking reference signal in predetermined starting and ending portions of each track which is formed obliquely to the longitudinal direction of the magnetic tape and with a digital audio signal in an intermediate portion between the starting and ending portions of each track. When playing a magnetic tape pre-recorded in a half-speed mode, only the tape transport speed is set identical to that at the time of the recording. A tracking control is carried out based on tracking reference signals reproduced during predetermined two successive scans out of four successive scans made with respect to every two mutually adjacent tracks.

5 Claims, 16 Drawing Sheets

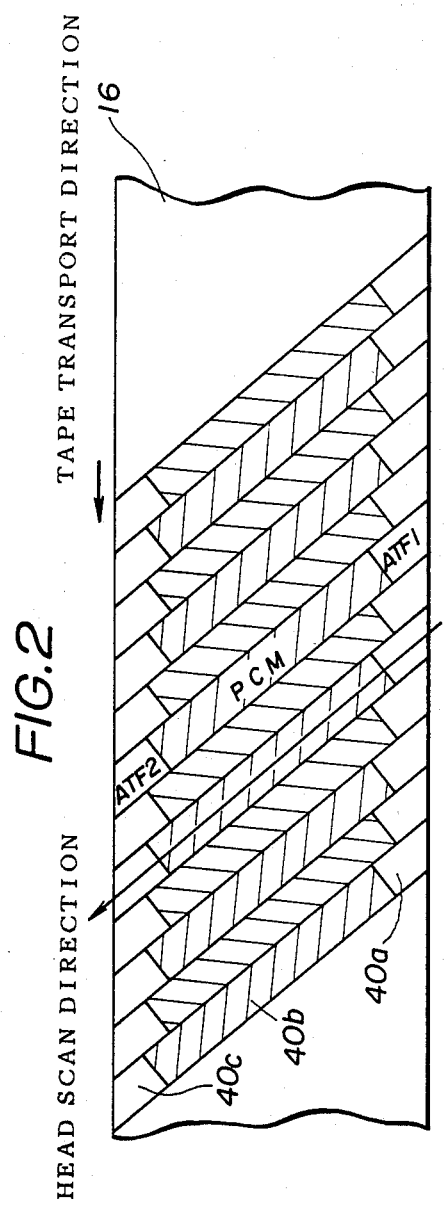
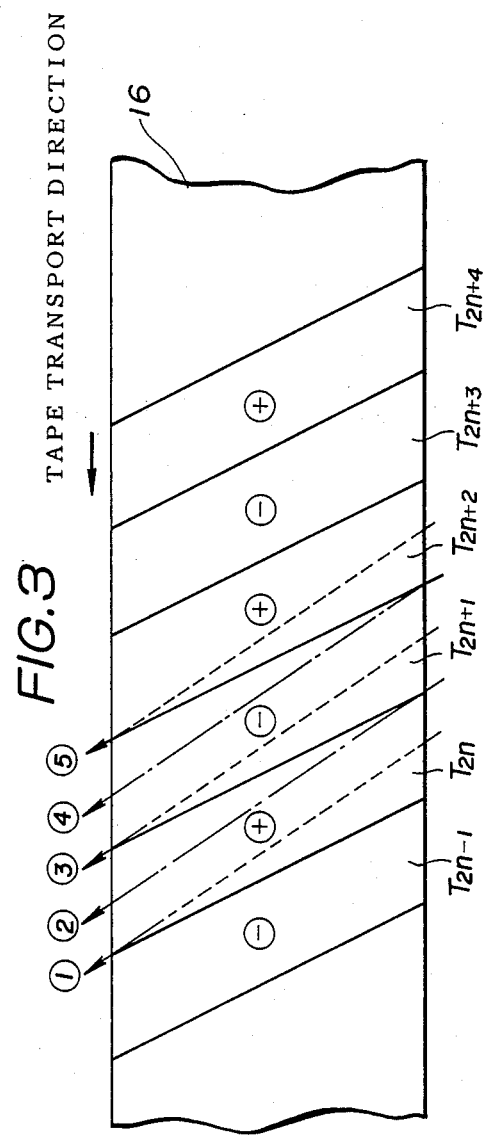

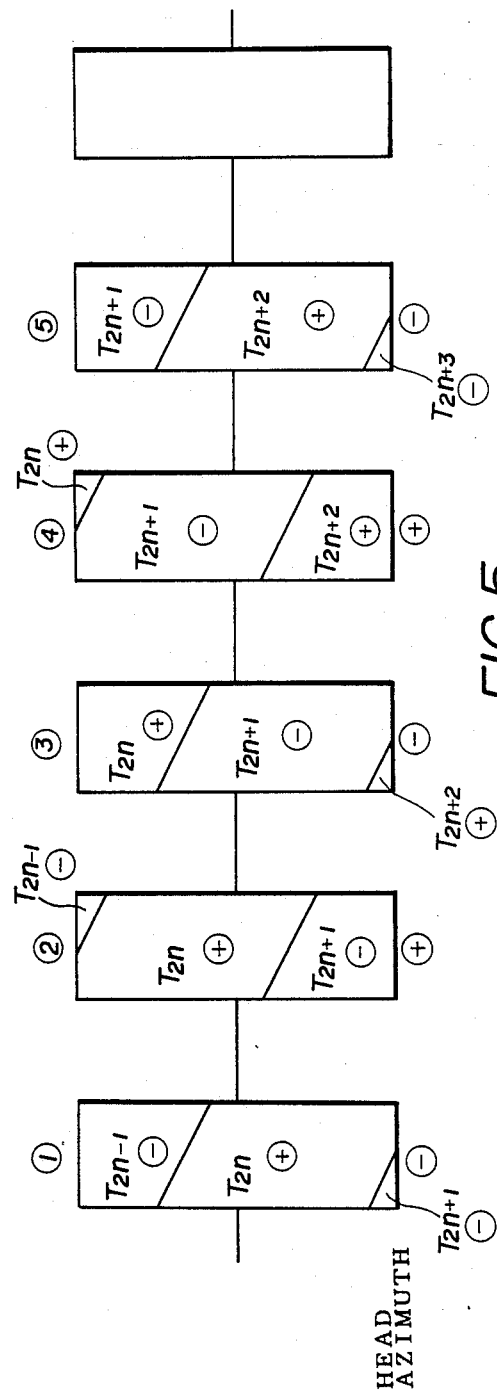
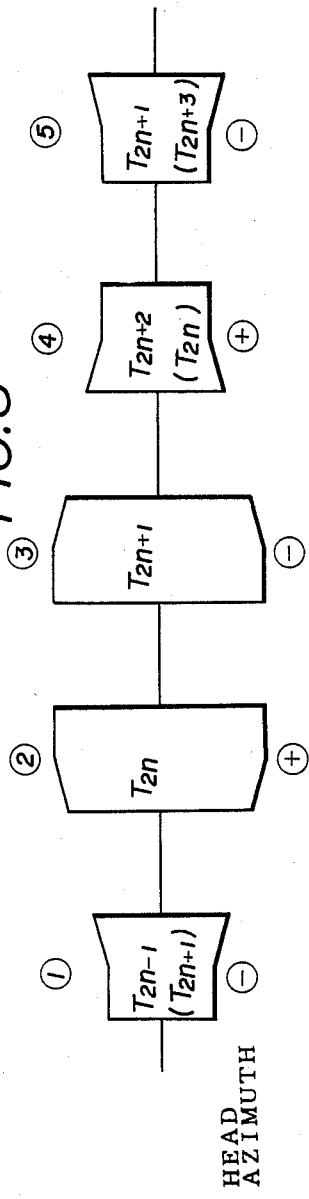

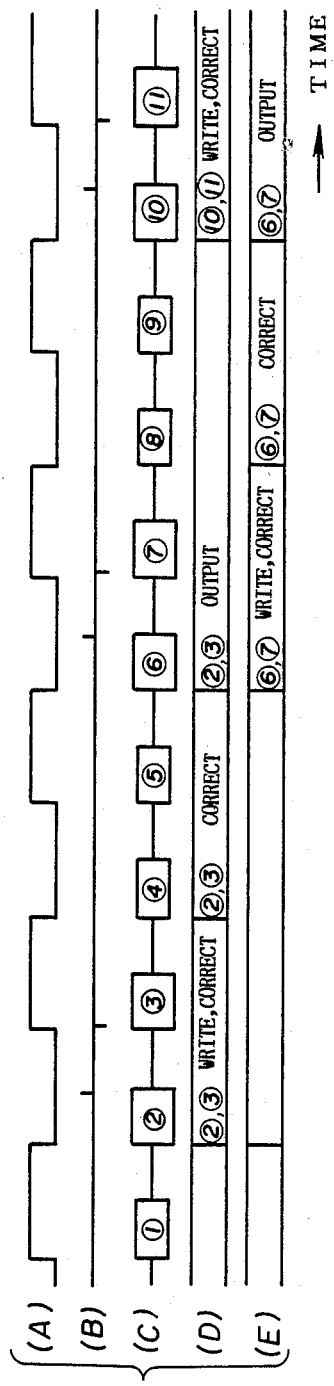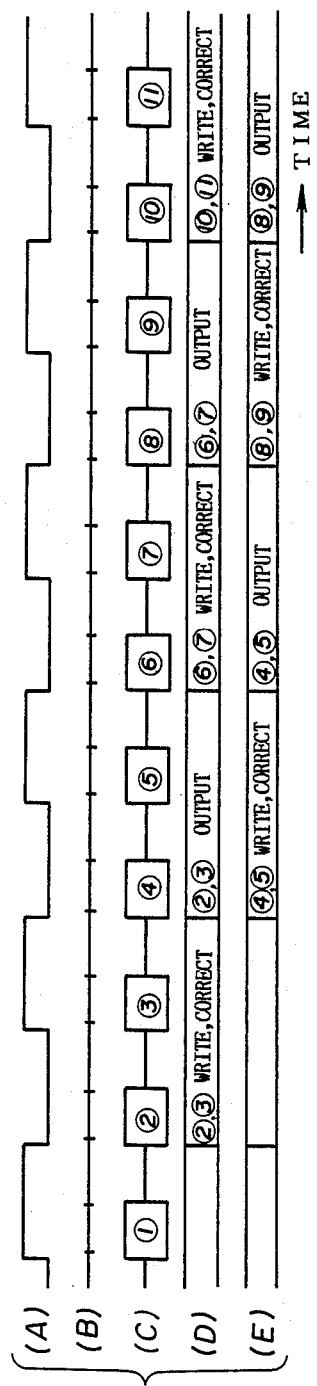

ROTARY HEAD TYPE DIGITAL SIGNAL REPRODUCING APPARATUS WITH DIFFERENT MODES AND TRACKING CONTROL

BACKGROUND OF THE INVENTION

The present invention generally relates to rotary head type digital signal reproducing apparatuses, and more particularly to a rotary head type digital signal reproducing apparatus for playing a magnetic tape which is pre-recorded with a tracking reference signal in predetermined starting and ending portions of each track which is formed obliquely to the longitudinal direction of the magnetic tape and with a digital audio signal in an intermediate portion between the starting and ending portions of each track.

In a digital audio tape recorder, an analog audio signal is modulated into PCM audio data by a pulse code modulation (PCM), and the PCM audio data are recorded on and reproduced from a magnetic tape. In a rotary head type digital audio tape recorder which employs rotary magnetic heads, data are successively recorded on and reproduced from tracks formed obliquely to a longitudinal direction of the magnetic tape without a guard band between two mutually adjacent tracks, alternately by a pair of rotary heads having gaps of mutually different azimuth angles. A tracking reference signal is recorded on and reproduced from starting and ending portions of each track, while the PCM audio data are recorded and reproduced from an intermediate portion between the starting and ending portions of each track with a predetermined signal format.

The PCM audio data are recorded and reproduced with at least two kinds of modes. In a linear standard mode, the PCM audio data have a sampling frequency of 48 kHz, two channels and a quantization number of sixteen bits. On the other hand, in a non-linear long-time mode (hereinafter referred to as a half-speed mode), the PCM audio data have a sampling frequency of 32 kHz, two channels and a quantization number of twelve bits. Actually, there are other non-linear modes such as a mode in which the PCM audio data have a sampling frequency of 44.1 kHz, four channels and a quantization number of twelve bits, however, these other modes all have the same play time as the standard mode.

In the half-speed mode, the rotational speed of a rotary drum on which the rotary heads are mounted and the tape transport speed are respectively set to speeds which are one-half those in the standard mode. In addition, the frequencies of digital signals (more accurately, the frequencies of clock pulses for producing the PCM audio data and a the tracking reference signal) are set to one-half those in the standard mode. In other words, the operation speed of the digital audio tape recorder as a whole in the half-speed mode is set to one-half that in the standard mode, except for a part of the digital audio tape recorder where a conversion is carried out between the analog audio signal and the digital signal.

The data rate in the standard mode is 48 (kHz)$\times 2\times 16=1536$ (kbits/sec), and the data rate in the half-speed mode is 32 (kHz)$\times 2\times 12=768$ (kbits/sec). Accordingly, the sound quality obtained in the half-speed mode is slightly deteriorated when compared to that obtained in the standard mode, but there is an advantage in that the play time in the half-speed mode is two times that in the standard mode for a given length of the magnetic tape because the operation speed of the digital audio tape recorder in the half-speed mode is set to one-half that in the standard mode.

It is desirable that the half-speed mode is added to the rotary head type digital audio tape recorder having the standard mode. However, due to the following problems, the realization of such a digital audio tape recorder is difficult costwise and technically, and would cause deterioration in the quality of the digital audio tape recorder.

Firstly, the tracking reference signal frequency and the carrier frequency of the PCM audio data in the half-speed mode become one-half those in the standard mode. For this reason, particularly in the reproducing mode, the operation frequencies of an analog filter circuit part and a phase locked loop (PLL) circuit part for reading data within a signal processing circuit for processing the tracking reference signal and the PCM audio data must be switched between the standard and half-speed modes. Alternatively, it is necessary to provide a circuit part exclusively for use in the standard mode and another circuit part exclusively for use in the half-speed mode.

Secondly, the coupling between the rotary heads mounted on the rotary drum and a recording amplifier and a reproducing amplifier is normally made through a rotary transformer. However, since the signal frequency in the half-speed mode becomes one-half that in the standard mode, the coupling in the low frequency range becomes deteriorated in the half-speed mode.

Thirdly, when the setting is made so that an optimum carrier-to-noise ratio is obtained in the standard mode, an output voltage of the reproducing rotary head in the half-speed mode becomes one-half that in the standard mode because the relative linear velocity between the magnetic tape and the rotary head in the half-speed mode is one-half that in the standard mode. As a result, according to this setting, the carrier-to-noise ratio becomes deteriorated in the half-speed mode.

Fourthly, a drum motor for rotating the rotary drum and a capstan motor for rotating a capstan which drives the magnetic tape must have predetermined performances in the two rotational speeds corresponding to the standard and half-speed modes, where the predetermined performances refer to the tolerable range of the jitter in the rotation of the rotary drum for maintaining phase synchronism between the rotation of the rotary drum and an electrical circuit, the tolerable range of instability of the rotation of the capstan motor and the like.

SUMMARY OF THE INVENTION

Accordingly, it is a general object of the present invention to provide a novel and useful rotary head type digital signal reproducing apparatus in which the first two problems described before are eliminated and the latter two problems described before are substantially overcome.

Another and more specific object of the present invention is to provide a rotary head type digital signal reproducing apparatus for playing a magnetic tape pre-recorded with a time division multiplexed signal in one of first and second modes, where the time division multiplexed signal comprises a PCM audio data which is obtained by subjecting an orignal audio signal to a pulse code modulation and a tracking reference signal. The tracking reference signal which amounts to a predetermined time period is time division multiplexed before and after the PCM audio data which amounts to a certain time period, and the time division multiplexed signal is recorded on successive tracks formed obliquely to a longitudinal direction of the magnetic tape by two rotary heads. In the second mode, a data quantity per unit time, a frequency of the tracking reference signal, a rotational speed of the rotary heads and a tape transport speed of the magnetic tape are one-half those in the first mode. The rotary head type digital signal reproducing apparatus comprises a reproducing circuit including two rotary heads for reproducing pre-recorded signals from the magnetic tape, a circuit for setting the tape transport speed to a speed identical to that in the second mode and for setting the rotational speed of the rotary heads to a speed identical to that in the first mode when playing the magnetic tape pre-recorded in the second mode, a tracking control circuit for controlling tracking of the rotary heads based on reproduced tracking reference signals reproduced by the reproducing circuit, where the reproduced tracking reference signals include out of reproduced signals obtained from the reproducing circuit during a total of four successive scans made by the rotary heads with respect to two mutually adjacent tracks on the magnetic tape at least a reproduced tracking reference signal obtained in an ending portion of a first scan and a reproduced tracking reference signal obtained in a beginning portion of a second scan immediately after the first scan, and the first and second scans are successive scans in which a large reproduced output is obtainable by the rotary heads from the two mutually adjacent tracks, and a decoding circuit for decoding the reproduced signals obtained from the reproducing circuit into the original audio signal based on a reproduced PCM audio data reproduced from one of the two mutually adjacent tracks during the first scan and a reproduced PCM audio data reproduced from the other of the two mutually adjacent tracks during the second scan.

According to the apparatus of the present invention, the frequencies of the tracking reference signal and the modulated PCM audio data when playing the magnetic tape pre-recorded in the second mode can be made substantially the same as those in the first mode, since the magnetic tape recorded in the second mode is played with the rotational speed of the rotary heads set to two times that at the time of the recording. For this reason, circuit parts of the apparatus can be used in common when playing the magnetic tape pre-recorded in the first mode and when playing the magnetic tape pre-recorded in the second mode.

Still another object of the present invention is to provide a rotary head type digital signal reproducing apparatus in which the decoding circuit comprises a memory for temporarily storing the reproduced PCM audio data including parity codes, and an error detecting and correcting circuit for detecting and correcting errors in the reproduced signals by carrying out an error detecting and correcting operation on the PCM audio data including parity codes stored in the memory. The error detecting and correcting operation is carried out at the same speed when playing the magnetic tape pre-recorded in the first mode and the magnetic tape pre-recorded in the second mode, and the error detecting and correcting operation is repeated two times when playing the magnetic tape pre-recorded in the second mode.

According to the apparatus of the present invention, the error detecting and correcting capability is improved compared to the conventional apparatus, and it is possible to obtain a reproduced audio signal of a high sound quality. A further object of the present invention is to provide a rotary head type digital signal reproducing apparatus in which the error correcting operation is carried out within first correcting time periods during a first of two successive revolutions of the rotary heads and also within second correcting time periods during a latter of the two successive revolutions when playing the magnetic tape pre-recorded in the second mode. The first correcting time periods respectively start a predetermined time after a beginning of a scan to an end of the scan made by a corresponding one of the two rotary heads during the first revolution, and the second correcting time periods respectively start a predetermined time after a beginning of a scan to an end of the scan made by a corresponding one of the two rotary heads during the second revolution. The error correcting operation is carried out also within at least one of third correcting time periods. One of the third correcting time periods is defined by an end of one of the first correcting time periods corresponding to an end of the first revolution and a start of one of the second correcting time periods corresponding to the predetermined time after a beginning of the second revolution. The other of the third correcting time periods is defined by an end of the one of the second correcting time periods and a start of the other of the second correcting time periods.

According to the apparatus of the present invention, the error correcting capability is further improved because the third correcting time period is effectively utilized for the correction.

Other objects and further features of the present invention will be apparent from the following detailed description when read in conjunction with the accompanying drawings.

BRIEF DESCRIPTION OF THE DRAWINGS

FIG. 2 shows a track pattern on a magnetic tape played on the apparatus shown in FIG. 1;

FIG. 3 is a diagram for explaining scanning loci of rotary heads of the apparatus shown in FIG. 1 in a half-speed mode;

FIG. 4 is a diagram for explaining contact areas of the rotary heads with respect to recorded tracks on the magnetic tape;

FIG. 5 is a diagram for explaining output signal levels of the rotary heads for the case shown in FIG. 5;

FIGS. 14(A) through 14(E) and FIGS. 15(A) through 15(E) are timing charts for explaining the operation of a memory and the like in the half-speed mode and the standard mode, respectively;

DETAILED DESCRIPTION

Figure 1:
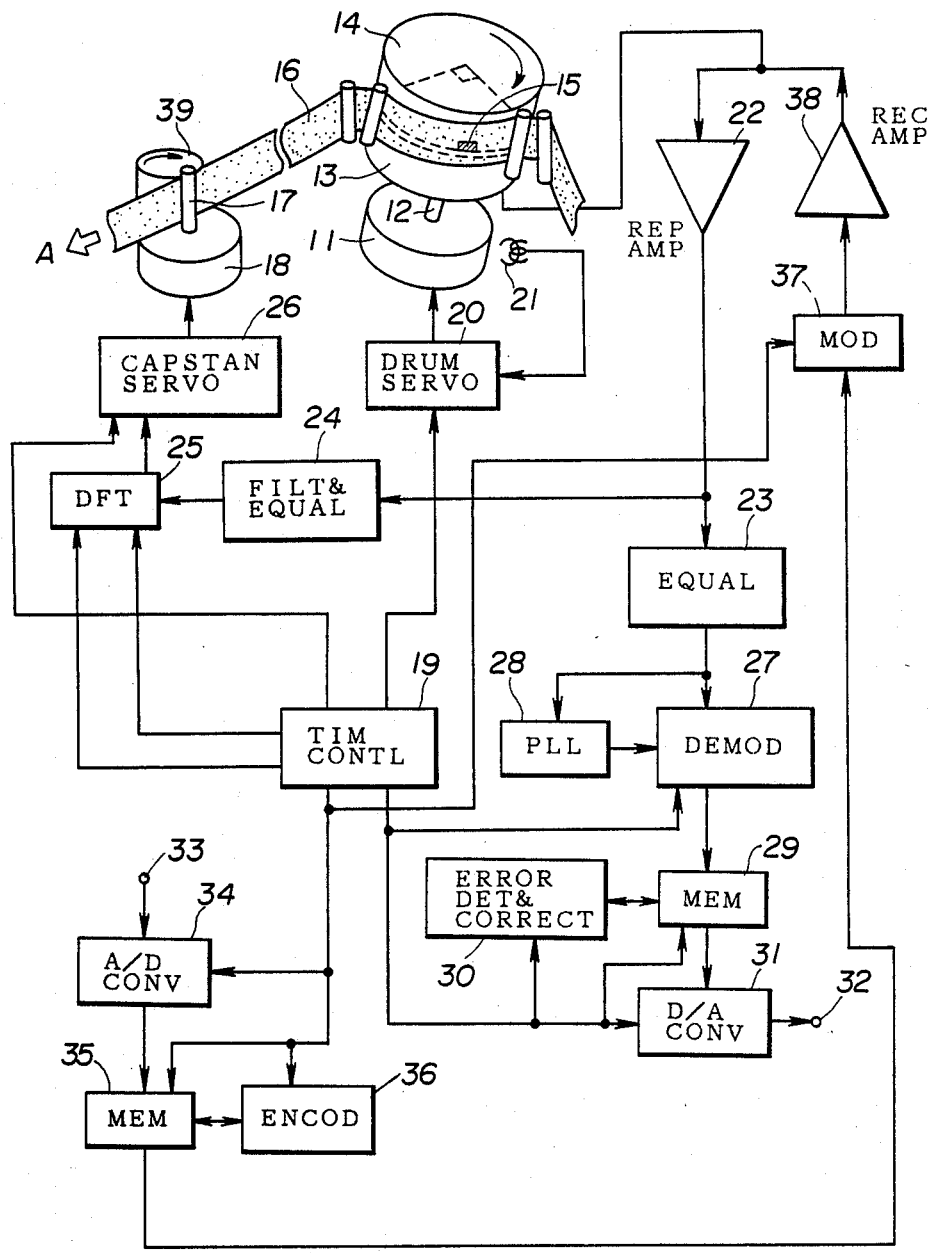
FIG. 1 is a system block diagram showing a first embodiment of the rotary head type digital signal reproducing apparatus according to the present invention.

FIG. 1 shows a first embodiment of the rotary head type digital signal reproducing apparatus according to the present invention. In order to facilitate the understanding of the present invention, FIG. 1 also shows an essential part of a recording system which is known, and in this respect, the apparatus shown in FIG. 1 is actually a recording and reproducing apparatus.

First, although not directly related to the subject matter of the present invention, a description will be given on the recording operation. An analog audio signal applied to an input terminal 33 is converted into PCM audio data in an analog-to-digital (A/D) converter 34, and the PCM audio data are thereafter written into a memory 35. The PCM audio data are added with a parity code generated in an encoder 36, and are supplied to a modulating circuit 37 after being interleaved and being subjected to a time base compression. The modulating circuit 37 produces a modulated digital signal by modulating the PCM audio data and the added parity code based on a known modulation system (for example, the 8-10 conversion).

On the other hand, a timing control circuit 19 generates a gate signal, and a tracking reference signal such as a synchronizing signal $f_S$ and a pilot signal $f_P$ during an interval corresponding to a tracking reference signal recording section of each track on a magnetic tape 16. The gate signal and the tracking reference signal are supplied to the modulating circuit 37, and the modulating circuit selectively outputs the modulated digital signal or the tracking reference signal responsive to the gate signal.

Accordingly, the modulating circuit 37 produces a time division multiplexed signal in which the modulated digital signal is transmitted in a certain interval and the tracking reference signal is transmitted in predetermined intervals before and after the certain interval. This time division multiplexed signal is passed through a recording amplifier 38 and a rotary transformer (not shown) and is supplied to two rotary magnetic heads mounted at diametrical positions on a rotary drum 14, and the time division multiplexed signal is alternately recorded on a magnetic tape 16 by the two rotary magnetic heads in either the standard more or the half-speed mode. As a result, a track pattern such as that shown in FIG. 2 is formed on the tape 16.

In FIG. 1, a rotary shaft 12 of a drum motor 11 penetrates a central portion of a stationary drum 13 and is fixed to a central portion of the rotary drum 14. A rotary head 15 and another rotary head (not shown) are mounted at the diametrical positions on a rotational plane of the rotary drum 14. The tape 16 is wrapped obliquely around a peripheral surface of the rotary drum 14 for an angular range of approximately 90°. The tape 16 is transported in a direction A in a state pinched between a capstan 17 and a pinch roller 39.

The rotary head 15 and the other rotary head have gaps of mutually different azimuth angles, and the two rotary heads have a track width greater than a track width of the recorded tracks on the tape 16. For example, the track width of the two rotary heads are 1.5 times the track width of the recorded tracks. The rotary shaft 12 rotates unitarily with the rotary drum 14. In the standard mode, the rotary heads rotate at a rotational speed of 2000 rpm, for example, and the rotary heads also rotate at this rotational speed of 2000 rpm in the half-speed mode of the present invention. In the half-speed mode of the present invention, the tape transport speed of the tape 16 which is driven by the capstan 17 is set to one-half the tape transport speed in the standard mode.

The tape 16 has the track pattern shown in FIG. 2. In each track shown in FIG. 2, the PCM audio data amounting to a predetermined time is recorded in a track portion 40b indicated by a hatching, and the tracking reference signal (ATF1) is recorded in a track portion 40 a between the beginning of the track and the beginning of the track portion 40 b and the tracking reference signal (ATF2) is also recorded in a track portion 40 c between the end of the track portion 40 b and the end of the track.

The tape 16 is pre-recorded in the conventional half-speed mode, and at the time of the recording in the half-speed mode, two rotary heads rotate at 1000 rpm. However, in the half-speed mode of the present invention, this tape 16 is played by rotating the two rotary heads at 2000 rpm which is two times the speed at the time of the recording. A drum servo circuit 20 controls the rotation of the drum motor 11 and the rotary drum 14, based on a drum servo signal supplied from a timing control circuit 19. As is well known, the drum servo signal is compared in the servo circuit 20 with a drum pulse signal which is obtained by detecting the rotation of the rotary drum 14 by a stationary detection head 21, and the rotational speed and phase of the rotary drum 14 are controlled by the drum servo circuit 20.

On the other hand, the tape transport speed in the half-speed mode of the present invention is identical to that at the time of the recording. As a result, the scanning loci of the two rotary heads which rotate at two times the rotational speed at the time of the recording do not coincide with the tracks on the tape 16. As shown in FIG. 3, center lines of the successive scans become as indicated by phantom lines ① through ④ with respect to two mutually adjacent tracks $T_{2n}$ and $T_{2n+1}$. In other words, four scans are made by the two rotary heads with respect to the two mutually adjacent tracks $T_{2n}$ and $T_{2n+1}$.

In FIG. 3, the tracks $T_{2n-1}$, $T_{2n+1}$ and $T_{2n+3}$ are tracks recorded by the rotary head having the gap of a negative azimuth angle, while the tracks $T_{2n}$, $T_{2n+2}$ and $T_{2n+4}$ are tracks recorded by the rotary head having the gap of a positive azimuth angle. No guard band is formed between two mutually adjacent tracks. The phantom lines ① and ③ indicate the center lines of the scans made by the rotary head (for example, the rotary head provided diametrically to the rotary head 15) having the gap of the negative azimuth angle, and the phantom lines ② and ④ indicate the center lines of the scans made by the rotary head (for example, the rotary head 15) having the gap of the positive azimuth angle.

FIG. 4 shows the contact areas of the two rotary heads with respect to the tracks during the successive scans the center lines of which are indicated by ① through ⑤. Out of the signals alternately reproduced by the two rotary heads, a reproduced signal having a frequency over a predetermined value is obtained from the rotary head only when the rotary head scans the track which has been recorded by the rotary head having the gap of the same azimuth angle, due to the well known azimuth loss effect. In addition, the level of the reproduced signal is approximately proportional to the contact area of the rotary head which scans the track. Accordingly, when the two rotary heads scan the tape 16 shown in FIG. 3, the relationship of the tracks from which the reproduced signals are obtained by the two rotary heads and the signal levels thereof becomes as shown in FIG. 5.

As may be seen from FIG. 5, out of the four scans ① through ④ made by the two rotary heads with respect to the two mutually adjacent tracks $T_{2n}$ and $T_{2n+1}$, the reproduced signal levels obtained from the tracks $T_{2n}$ and $T_{2n+1}$ during the second and third scans ② and ③ are large compared to the reproduced signals levels obtained from the tracks $T_{2n}$ and $T_{2n+1}$ during the first and fourth scans ① and ④. Accordingly, in the present embodiment, the demodulation is carried out on the modulated PCM audio data with in the reproduced signals obtained from the two mutually adjacent tracks $T_{2n}$ and $T_{2n+1}$ during the second and third scans, so that a satisfactory signal-to-noise (S/N) ratio is obtainable.

Figure 6:
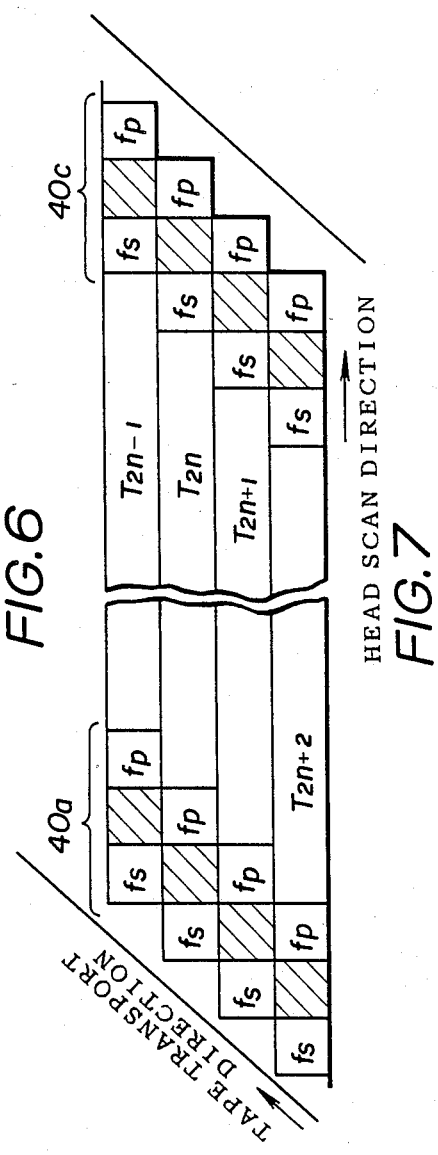
FIG. 6 shows a recording pattern of a tracking reference signal on the magnetic tape.

Next, a description will be given on the reproduction of the tracking reference signal. As described before, the tracking reference signal is recorded in the beginning portion and the ending portion of each track. The tracking reference signal is recorded with a signal pattern shown in FIG. 6. In FIG. 6, those parts which are the same as those corresponding parts in FIGS. 2 and 3 are designated by the same reference numerals. As shown in FIG. 6, the tracking reference signal comprises the synchronizing signal $f_S$ for controlling the sample and hold timing of the detected output of the tracking reference signal, and the pilot signal $f_P$. The frequency of the synchronizing signal $f_S$ is set to a relatively high frequency so that a sufficient azimuth loss effect would occur. For example, the synchronizing signal $f_S$ recorded on one of the two mutually adjacent tracks has a frequency of approximately 500 kHz while the synchronizing signal $f_S$ recorded on the other of the two mutually adjacent tracks has a frequency of approximately 780 kHz. On the other hand, the frequency of the pilot signal $f_P$ is set to a constant low frequency so that only a small azimuth loss effect would occur and the pilot signal $f_P$ would be reproduced as crosstalk from an adjacent track. For example, the pilot signal $f_P$ has a frequency of approximately 130 kHz.

As may be seen from FIG. 6, in each track portion where the tracking reference signal is recorded, the synchronizing signal $f_S$ is recorded in a synchronizing signal recording section, a signal recording section of approximately 1.56 MHz, for example, is provided after the synchronizing signal recording section for erasing the previous signal as indicated by a hatching, and the pilot signal $f_P$ is recorded in a pilot signal recording section. The signal recording sections are arranged so that the pilot signal recording section in one track is adjacent to the signal recording section indicated by the hatching in a track immediately preceding the one track, and the synchronizing signal recording section and the pilot signal recording section are not adjacent to each other between two mutually adjacent tracks. This signal pattern of the tracking reference signal is known.

Figure 7:
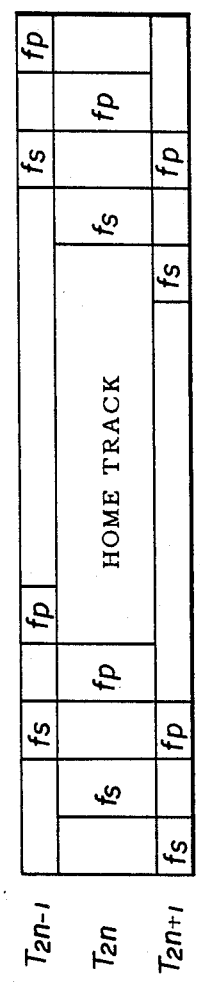
FIG. 7 shows scanning areas of the rotary heads with respect to a home track and tracks adjacent thereto.

When the track recorded with the tracking reference signal is scanned at the time of the reproduction in the same mode as that at the time of the recording by use of the rotary heads having the gaps of the same azimuth angles as those of the rotary heads which were used at the time of the recording, the rotary head which scans the track $T_{2n}$, for example, scans its home track $T_{2n}$ and portions of the adjacent tracks $T_{2n-1}$ and $T_{2n-1}$ on both sides of the home track $T_{2n}$ as shown in FIG. 7. (A "home track" of a reproducing rotary head means the track which was recorded by a head having the same azimuth angle as the reproducing head.) As described before, the synchronizing signal $f_S$ is only reproduced from the home track $T_{2n}$, while the pilot signal $f_P$ is not only reproduced from the home track $T_{2n}$ but is also reproduced as crosstalk from the adjacent tracks $T_{2n-1}$ and $T_{2n+1}$. As a result, the content of the reproduced signal obtained from the rotary head, the signal level and the reproduced track become as shown in FIG. 8.

Figure 8:
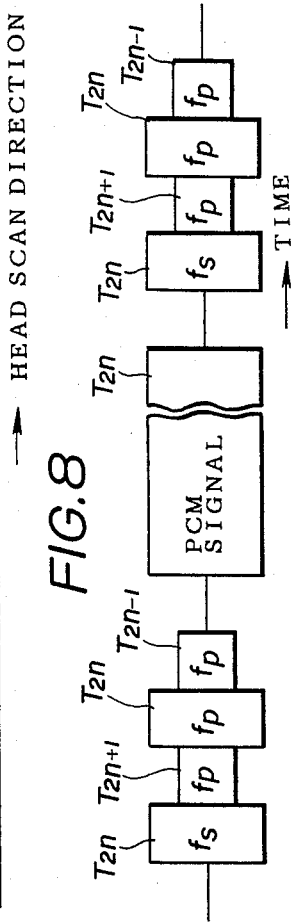
FIG. 8 schematically shows a reproduced signal comprising the tracking reference signal and a PCM audio signal.
Figure 9:
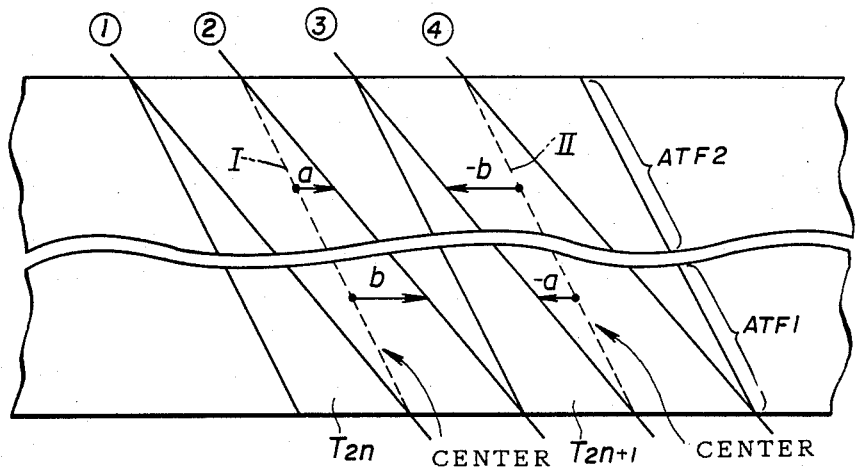
FIG. 9 is a diagram for explaining tracking offsets between tracking reference signal recording sections and the scanning loci of the rotary head.

However, FIG. 8 shows the case where the rotary head scans along a scanning locus identical to the track. When the rotary heads scan in the half-speed mode of the present invention the tracks which were recorded in the conventional half-speed mode, the rotary heads scan along scanning loci different from the recorded tracks as shown in FIG. 9. In FIG. 9, those parts which are the same as those corresponding parts in FIG. 3 are designated by the same reference numerals.

In FIG. 9, with respect to a center line I of the track $T_{2n}$, there is a tracking offset +b (average value) in the tracking reference signal recording section at the beginning of the track $T_{2n}$ and a tracking offset +a (average value) in the tracking reference signal recording section at the end of the track $T_{2n}$ during the second scan ②.

In addition, with respect to a center line II of the next track $T_{2n+1}$, there is a tracking offset $-a$ (average value) in the tracking reference signal recording section at the beginning of the track $T_{2n}$ and a tracking offset $-b$ (average value) in the tracking reference signal recording section at the end of the track $T_{2n}$ during the third scan ③.

Figure 10:
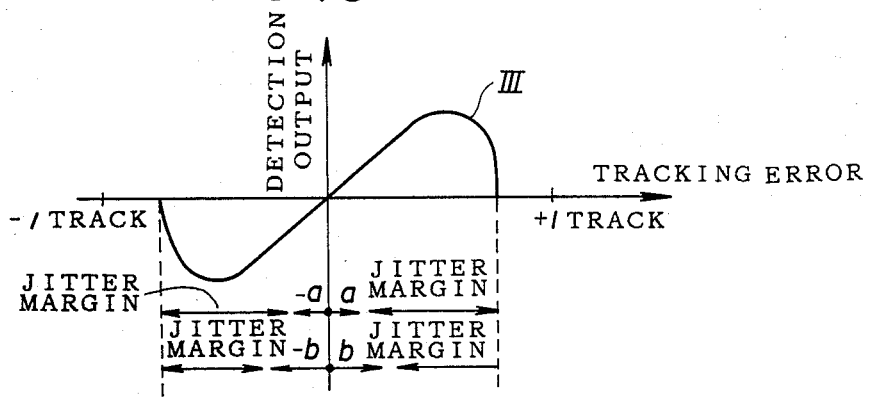
FIG. 10 shows a tracking reference signal detection output versus tracking error characteristic.

Accordingly, when the detected outputs of the two tracking reference signals including errors caused by the tracking offsets $+a$ and $-a$ are averaged, that is, when tracking error signals caused by the tracking offsets $+a$ and $-a$ are averaged, the effects of the tracking offsets become zero, and there is no need to carry out an additional process such as adding an offset voltage to the detected output of the tracking reference signal. Similarly, when the tracking error signals caused by the tracking offsets $+b$ and $-b$ are averaged, the effects of the tracking offsets also become zero. However, b is greater than a and it is desirable that the tracking error signal is small from the point of view of minimizing the jitter in the tracking reference signal. In addition, it may be seen from FIG. 10 which shows a tracking reference signal detection output versus tracking error characteristic III (S-curve) that the tolerable range of the jitter in the tracking reference signal, that is, the jitter margin, is larger for the case where the tracking error signals caused by the tracking offsets $+a$ and $-a$ are averaged.

Accordingly, in the present embodiment, the tracking control is carried out based on the two tracking reference signals respectively reproduced from the tracking reference signal recording section (track portion 40c) at the end portion of the track scanned during the second scan ② and from the tracking reference signal recording section (track portion 40a) at the beginning portion of the track scanned during the third scan ③.

It is of course possible to carry out the tracking control based on the tracking reference signals reproduced from all of the four tracking reference signal recording sections at the beginning and end portions of the two tracks scanned during the second and third scans ② and ③. Furthermore, it is possible to carry out the tracking control based on arbitrarily selected ones of the tracking reference signals reproduced from the four tracking reference signal recording sections of the two tracks scanned during the second and third scans ② and ③, and subtract an appropriate offset voltage when the averaged tracking offset does not become zero.

Returning now to the description of FIG. 1, the signals alternately reproduced from the tape 16 by the two rotary heads are passed through a rotary transformer (not shown) and a reproducing amplifier 22, and are supplied to a wave equalizing circuit 23 and a filtering and wave equalizing circuit 24. The synchronizing signal $f_S$ and the pilot signal $f_P$ are filtered and then subjected to a wave equalization in the filtering and wave equalizing circuit 24, and are supplied to a tracking reference signal detecting circuit 25.

As described before, the tracking reference signal is recorded in the conventional half-speed mode with a frequency which is one-half that in the standard mode. However, during the reproducing in the half-speed mode of the present invention, the rotary drum 14 rotates at the rotational speed which is two times that at the time of the recording which is carried out in the conventional half-speed mode, while the tape transport speed is set identical to that at the time of the recording.

As a result, the tape transport speed is considerably small compared to the rotational speed of the rotary drum 14, and the tracking reference signal is reproduced with a frequency which is substantially the same as that in the standard mode. Hence, the filtering and wave equalizing circuit 24 can be used in common for the standard and half-speed modes.

Similarly, in the half-speed mode of the present invention, the carrier frequency of the PCM audio data becomes substantially the same as that in the standard mode. For this reason, the wave equalizing circuit 23, a phase locked loop (PLL) circuit 28 and the like can be used in common for the standard and half-speed modes.

Figure 11:
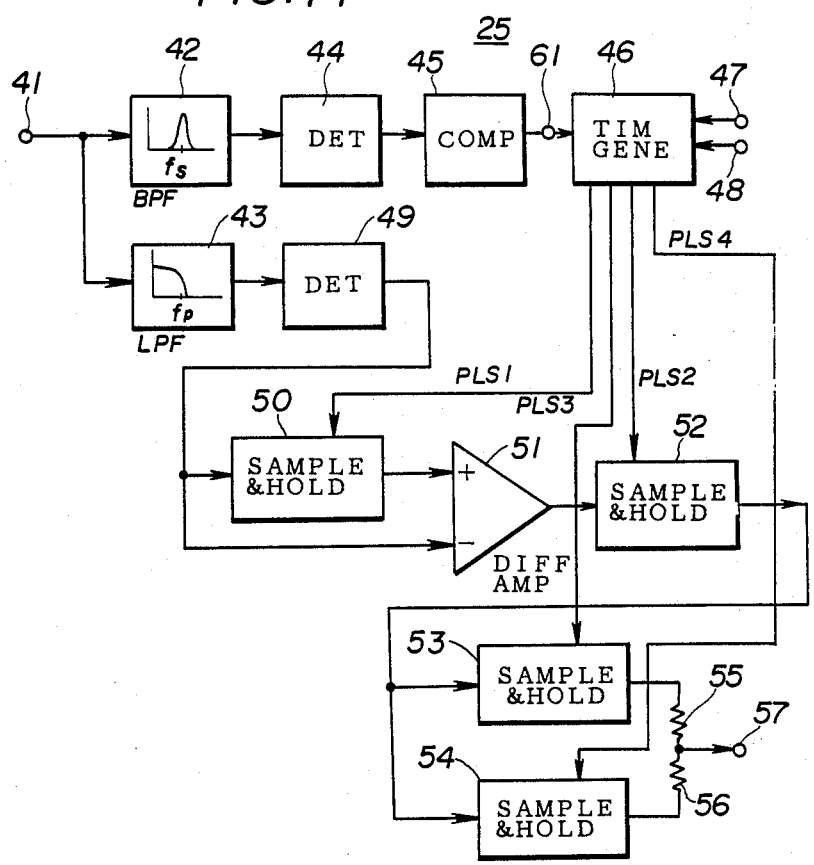
FIG. 11 is a system block diagram showing an embodiment of a tracking reference signal detecting circuit in the block system shown in FIG. 1.

FIG. 11 shows an embodiment of the tracking reference signal detecting circuit 25. In FIG. 11, the reproduced tracking reference signal is applied to an input terminal 41 and is supplied to a bandpass filter 42 and a lowpass filter 43. The bandpass filter 42 separates the reproduced synchronizing signal $f_S$ shown in FIG. 12(A) and FIG. 19(A) which will be described later, and supplies the reproduced synchronizing signal $f_S$ to a detecting circuit 44. The detecting circuit 44 detects the envelope of the reproduced synchronizing signal $f_S$ and supplies an output detection signal to a timing generating circuit 46 through a comparator 45. On the other hand, the lowpass filter 43 separates the reproduced pilot signal $f_P$ shown in FIG. 12(B) and FIG. 19(B) which will be described later.

Figure 13:
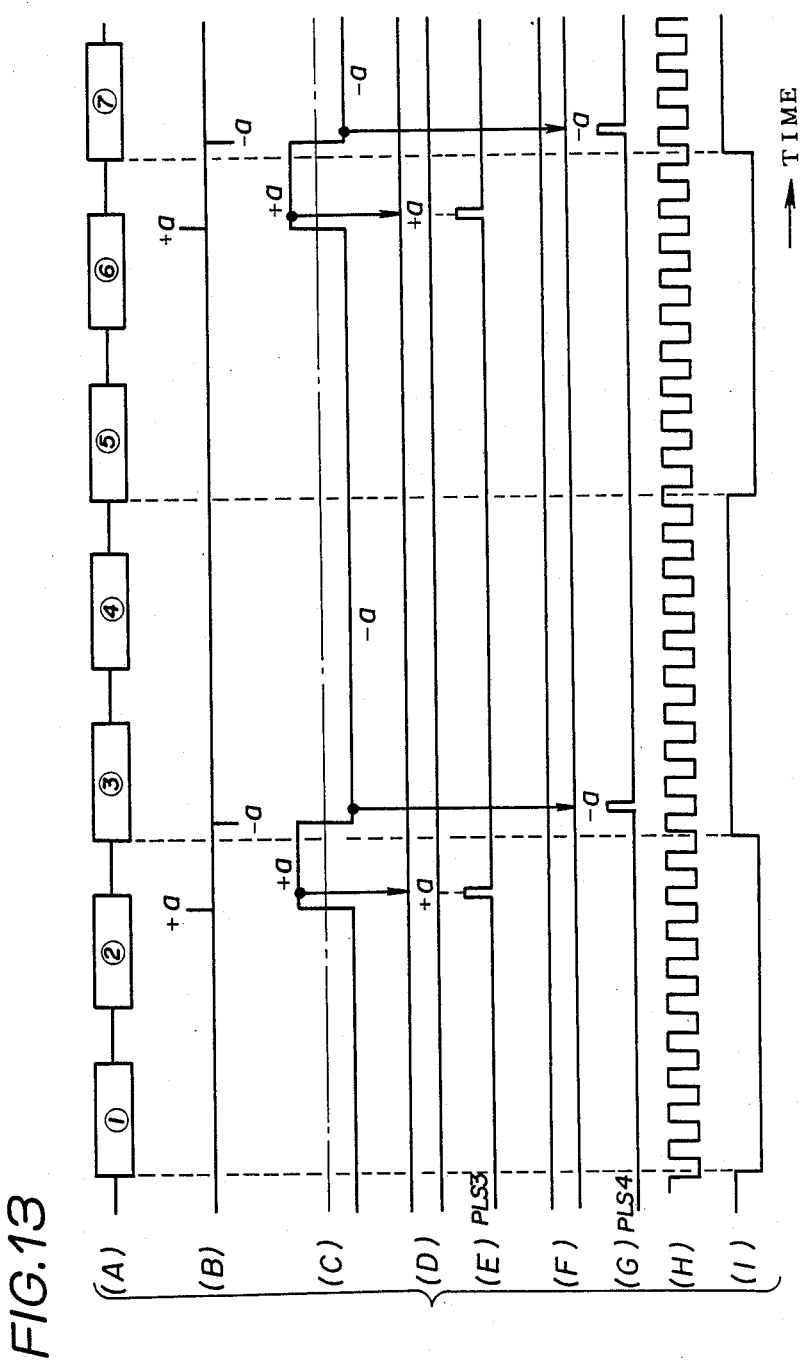
Figure 20:
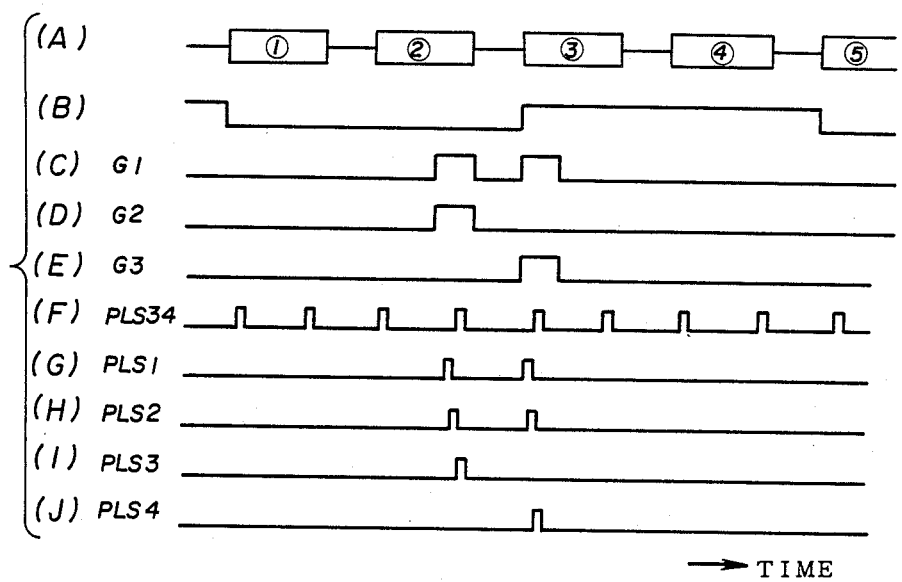

First and second timing signals respectively shown in FIGS. 13(H) and 13(I) are generated from the timing control circuit 19 shown in FIG. 1 and are supplied to the timing generating circuit 46 through input terminals 47 and 48. As shown in FIGS. 13(I) and 20(B), the second timing signal is a square wave having a polarity which is inverted for every two track scans in synchronism with the scanning of the tracks by the rotary heads shown schematically in FIGS. 14(A) and 20(A). On the other hand, as shown in FIG. 13(H), the first timing signal is a square wave having a constant repetition frequency in the order of ten odd times that of the second timing signal, for example. In FIGS. 13 and 20, the reference numerals ① through ④ correspond to the first through fourth scans ① through ④ of the rotary heads shown in FIGS. 2 and 9.

Figure 12:
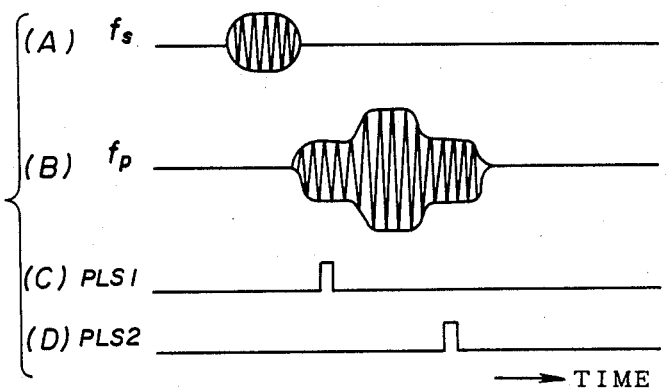
FIG. 12(A) through 12(D) and FIGS. 13(A) through 13(I) show signal waveforms for explaining the operation of the block system shown in FIG. 11.

Based on the incoming signals, the timing generating circuit 46 generates a first sampling pulse signal PLS1 shown in FIG. 12(C), a second sampling pulse signal PLS2 shown in FIG. 12(D), a third sampling pulse signal PLS3 shown in FIG. 13(E), and a fourth sampling pulse signal PLS4 shown in FIG. 13(G).

Figure 18:
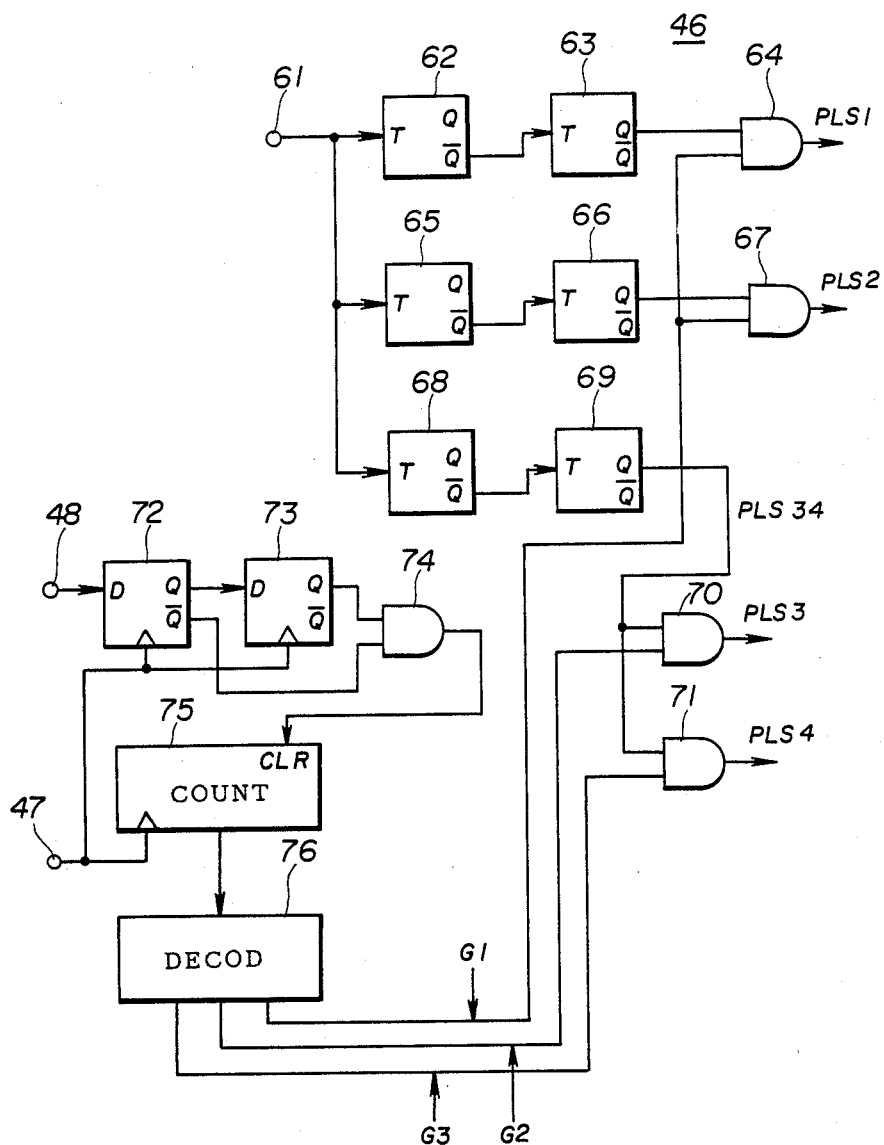
FIG. 18 is a system block diagram showing an embodiment of a timing generating circuit in the block system shown in FIG. 11.
Figure 19:
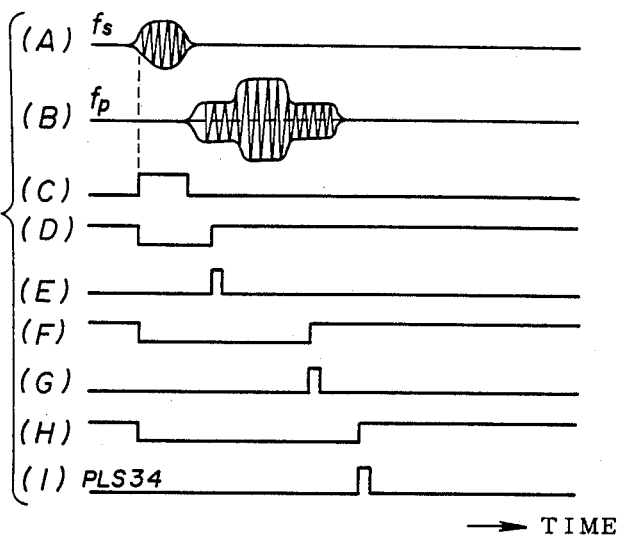
FIGS. 19(A) through 19(I) and FIGS. 20(A) through 20(J) show signal waveforms for explaining the operation of the block system shown in FIG. 18.

FIG. 18 shows an embodiment of the timing generating circuit 46. In FIG. 18, those parts which are the same as those corresponding parts in FIG. 11 are designated by the same reference numerals. In FIG. 18, the output signal of the comparator 45 shown in FIG. 19(C) is applied to a terminal 61 and is successively passed through monostable multivibrators 62 and 63, and an output signal of the monostable multivibrator 63 is supplied to one input terminal of a 2-input AND circuit 64. FIG. 19(D) shows a $\overline{Q}$-output signal of the monostable multivibrator 62, and FIG. 19(E) shows a Q-output signal of the monostable multivibrator 63.

The output signal of the comparator 45 is also successively passed through monostable multivibrators 65 and 66, and an output signal of the monostable multivibrator 66 is supplied to one input terminal of a 2-input AND circuit 67. Furthermore, the output signal of the comparator 45 is successively passed through monostable multivibrators 68 and 69, and an output signal of the monostable multivibrator 69 is supplied to one input terminal of a 2-input AND circuit 70 and to one input terminal of a 2-input AND circuit 71. FIGS. 19(F) and 19(G) respectively show a $\overline{Q}$-output signal of the monostable multivibrator 65 and a Q-output signal of the monostable multivibrator 66. FIG. 19(H) shows a $\overline{Q}$-output signal of the monostable multivibrator 68, and FIG. 19(I) and FIG. 20(F) which will be described later show a Q-output signal PLS34 of the monostable multivibrator 69.

On the other hand, the first timing signal shown in FIG. 13(H) and applied to the input terminal 47 shown in FIG. 18 is applied as a clock pulse signal to clock terminals of delay (D-type) flip-flops 72 and 73 and a counter 75. At the same time, the second timing signal shown in FIGS. 13(I) and 20(B) and applied to the input terminal 48 is applied to a data input terminal D of the flip-flop 72.

An AND circuit 74 is supplied with a $\overline{Q}$-output signal of the flip-flop 72 and a Q-output signal of the flip-flop 73 and obtains a logical product of the two signals. An output signal of the AND circuit 74 is applied to a clear terminal CLR of the counter 75. A counted output signal of the counter 75 is supplied to a decoder 76. The decoder 76 generates three kinds of gate signals G1, G2 and G3 respectively shown in FIGS. 20(C), 20(D) and 20(E) every time the counted value in the counter 75 reaches predetermined values. The gate signal G1 is supplied to the other input terminals of the AND circuits 64 and 67. The gate signal G2 is supplied to the other input terminal of the AND circuit 70, and the gate signal G3 is supplied to the other input terminal of the AND circuit 71. Accordingly, the sampling pulse signal PLS1 shown in FIGS. 12(C) and 20(G) is obtained from the AND circuit 64, and the sampling pulse signal PLS2 shown in FIGS. 12(D) and 20(H) is obtained from the AND circuit 67. In addition, the sampling pulse signal PLS3 shown in FIGS. 13(E) and 20(I) is obtained from the AND circuit 70, and the sampling pulse signal PLS4 shown in FIGS. 13(G) and 20(J) is obtained from the AND circuit 71.

Returning now the description of FIG. 11, the reproduced pilot signal $f_P$ shown in FIGS. 12(B) and 19(B) from the lowpass filter 43 is supplied to a detecting circuit 49 wherein the envelope of the reproduced pilot signal $f_P$ is detected. An output detection signal of the detecting circuit 49 is supplied to a sample and hold circuit 50 and a differential amplifier 51. The sample and hold circuit 50 samples and holds the signal reproduced from one of the two adjacent tracks on both sides of the home track based on the sampling pulse signal PLS1, and supplies a sampled and held voltage to the differential amplifier 51.

An output signal of the differential amplifier 51 shown in FIG. 13(B) is supplied to a sample and hold circuit 52 and is sampled and held based on the sampling pulse signal PLS2 shown in FIG. 12(D) which is generated during a time when the pilot signal $f_P$ is reproduced from the other of the two adjacent tracks on both sides of the home track. As a result, a sampled and held voltage shown in FIG. 13(C) is obtained from the sample and hold circuit 52. As may be seen from FIG. 13(C), the sampled and held voltage obtained from the sample and hold circuit 52 is a detection voltage of the tracking reference signal comprising the held voltage of the envelope detection level of the pilot signal $f_P$ reproduced from the tracking reference signal recording section at the end portion of the track during the second scan ② and the held voltage of the envelope detection level of the pilot signal $f_P$ reproduced from the tracking reference signal recording section at the beginning portion of the track during the third scan ③ .

The detection voltage of the tracking reference signal is supplied to sample and hold circuits 53 and 54 shown in FIG. 11 wherein the detection voltage is again sampled and held based on the respective sampling pulse signals PLS3 and PLS4 shown in FIGS. 13(E) and 13(G). Thus, sampled voltages shown in FIGS. 13(D) and 13(F) are respectively obtained from the sample and hold circuits 53 and 54, and are passed through respective mixing resistors 55 and 56 to be averaged. As a result, an averaged signal is obtained from a node between the resistors 55 and 56 and is outputted through an output terminal 57 as the tracking error signal.

The detection voltage of the tracking reference signal shown in FIG. 13(C) is sampled again in the sample and hold circuits 53 and 54 based on the sampling pulse signals PLS3 and PLS4 for the following reasons. That is, as may be seen from FIG. 13(C), the hold time of +a and the hold time of −a greatly differ. Since the tracking control is carried out based on the sampled and held voltages and the hold times, the resamplings in the sample and hold circuits 53 and 54 are carried out for the purpose of preventing undesirable effects caused by the different hold times.

At the time of the reproduction in the standard mode, the sampling pulse signal PLS3 is generated for every time period in which the tracking reference signal is reproduced from the tracking reference signal recording section at the end portion of each track. On the other hand, the sampling pulse signal PLS4 is generated for every time period in which the tracking reference signal is reproduced from the tracking reference signal recording section at the beginning portion of each track. In this case, it is possible to use the detection voltage from the sample and hold circuit 52 as the tracking error signal.

Returning now again to the description of FIG. 1, the tracking error signal from the tracking reference signal detecting circuit 25 is supplied to a capstan servo circuit 26 together with a timing signal from the timing generating circuit 19. Based on these signals, the capstan servo circuit 26 controls a capstan motor 18. Accordingly, the tape transport speed is controlled and the tracking control is carried out so that the rotary heads scan predetermined tracks.

The reproduced modulated PCM audio data (including parity code) obtained from the wave equalizing circuit 23 is supplied to the PLL circuit 28 and a demodulating circuit 27. A reproduced clock pulse signal obtained from the PLL circuit 28 is supplied to the demodulating circuit 27 and is used to demodulate the modulated PCM audio data. Responsive to a timing signal from the timing control circuit 19, the demodulating circuit 27 selectively supplies to a memory 29 only the PCM audio data (demodulated data) reproduced during the second and third scans ② and ③ of the rotary heads.

The memory 29 comprises first and second memory circuits (not shown), write/read control circuit (not shown) for the first and second memory circuits and the like. The operation of the memory 29 is shown schematically in FIGS. 14(D) and 14(E). FIG. 14(D) shows the operation of the first memory circuit and an error detecting and correcting circuit 30, and FIG. 14(E) shows the operation of the second memory circuit and the error detecting and correcting circuit 30. FIG. 14(C) schematically shows the reproduced signal from the rotary heads, and ①through ④ respectively correspond to the reproduced signals obtained during the first through fourth scans ① through ④ shown in FIGS. 3 and 9. When two mutually adjacent tracks are scanned four times by the two rotary heads, the reproduced signals obtained during the second scan are denoted by ②, ⑥, ⑩,... which are signals obtained during the (4m−2)th scans, where m is a positive integer. On the other hand, the reproduced signals obtained during the third scan are denoted by ③, ⑦, ⑪,... which are signals obtained during the (4m−1)th scans. FIG. 14(A) shows the drum servo signal for controlling the drum motor 11, and FIG. 14(B) shows the output signal of the differential amplifier 51 within the tracking reference signal detecting circuit 25.

Figure 16:
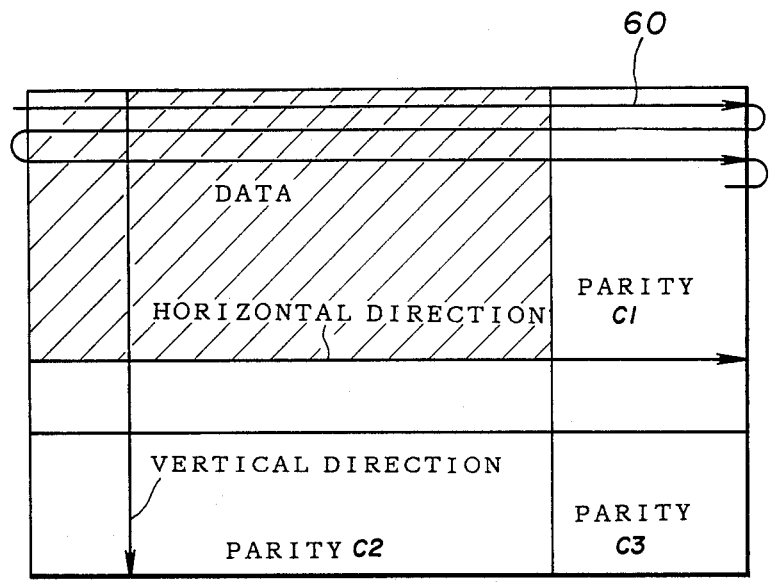
FIG. 16 shows a memory map of the memory shown in FIG. 1.

The memory 29 and the error detecting and correcting circuit 30 carry out operations with reference to various timing signals from the timing control circuit 19. FIG. 16 shows a memory map of the first and second memory circuits of the memory 29, wherein a data region is indicated by a hatching and a signal reproducing sequence is denoted by a line 60. The parity codes within the demodulated data are stored in a part other than the part indicated by the hatching. A first parity code C1 is generated from the data along the horizontal direction and a second parity code C2 is generated from the data along the vertical direction, respectively by using a generating polynomial. A third parity code C3 is generated from the second parity code C2 along the horizontal direction or from the first parity code C1 along the vertical direction, respectively by using the generating polynomial. According to such a doubly encoded coding, the error correcting capability is improved by repeatedly carrying out the error detecting and correcting operation.

FIG. 15(C) schematically shows the reproduced signals obtained at the time of the reproduction in the standard mode when the tape being played has been recorded in the standard mode. FIG. 15(A) shows the drum servo signal, and FIG. 15(B) shows the output signal of the differential amplifier 51 within the tracking reference signal detecting circuit 25 for this case. In this case, the first and second memory circuits of the memory 29 together with the error detecting and correcting circuit 30 respectively carry out the operations shown schematically in FIGS. 15(D) and 15(E).

As may be easily understood by comparing the operation of the memory 29 and the error detecting and correcting circuit 30 shown in FIGS. 15(D) and 15(E) during the reproduction in the standard mode and the operation of the memory 29 and the error detecting and correcting circuit 30 shown in FIGS. 14(D) and 14(E) during the reproduction in the half-speed mode of the present invention, in the half-speed mode of the present invention, the error detecting and correcting operation is carried out in the error detecting and correcting circuit 30 after the reproduced demodulated data is once stored in the memory 29 at the same speed as that during the error detecting and correcting operation in the standard mode.

Accordingly, during the half-speed mode of the present invention in which the data quantity per unit time is one-half that in the standard mode, it is possible to repeatedly carry out the error detecting and correcting operation two times. Therefore, the error correcting capability is improved.

Figure 17:
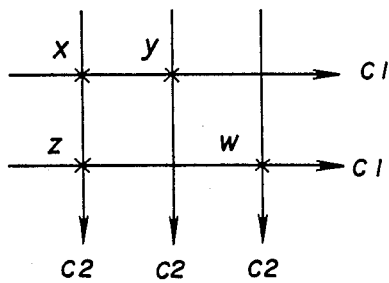
FIG. 17 is a diagram for explaining an error correcting operation.

For example, in the case where both the first and second parity codes C1 and C2 are single error correction codes and errors x, y, z, and w exist as shown in FIG. 17, the error detecting and correcting operation using the first parity code C1 once and the second parity code C2 once in sequence can only correct the errors y and w and the errors x and z cannot be corrected. However, when the error detecting and correcting operation is carried out two times, the errors y and w can be corrected by the first correcting operation using the second parity code C2, and the errors x and z can be corrected by the second correcting operation using the first parity code C1 because the errors y and w are already corrected by the first correcting operation.

The demodulated data once read out from the memory 29 is subjected to the error detecting and correcting operation in the error detecting and correcting circuit 30, and is again written into the memory 29. However, when the error correction cannot be carried out, an error flag is set in a parity region of the memory 29.

It is possible to consider setting the error flag in the parity region of the memory 29 after carrying out the two error detecting and correcting operations each using the first and second parity codes C1 and C2 once. However, since the first and second parity codes C1 and C2 are respectively used two times in the present embodiment, the part where the error flag is set becomes an error when the second correcting operation or the correction of the parity code itself is carried out if the error flag were set in the parity region of the memory 29 after the first error detecting and correcting operation is carried out. For this reason, it is necessary to set the error flag in the parity region of the memory 29 only after the second error detecting and correcting operation is carried out.

The demodulated data is read out from the memory 29 after being subjected to a time base expansion, deinterleaving, jitter compensation and the like in the memory circuit 29. This demodulated data is supplied to a digital-to-analog (D/A) converter 31 shown in FIG. 1 and is converted into an original analog audio signal based on the timing signals from the timing control circuit 19. When supplying the demodulated data to the D/A converter 31, the error flag is read out beforehand so as to discriminate whether the data is valid or invalid. When an error exists and the data is invalid, the data is replaced by a data which is obtained by carrying out an interpolation on the sampled data before and after the data containing the error. The original analog audio signal from the D/A converter 31 is outputted through an output terminal 32.

Figure 21:
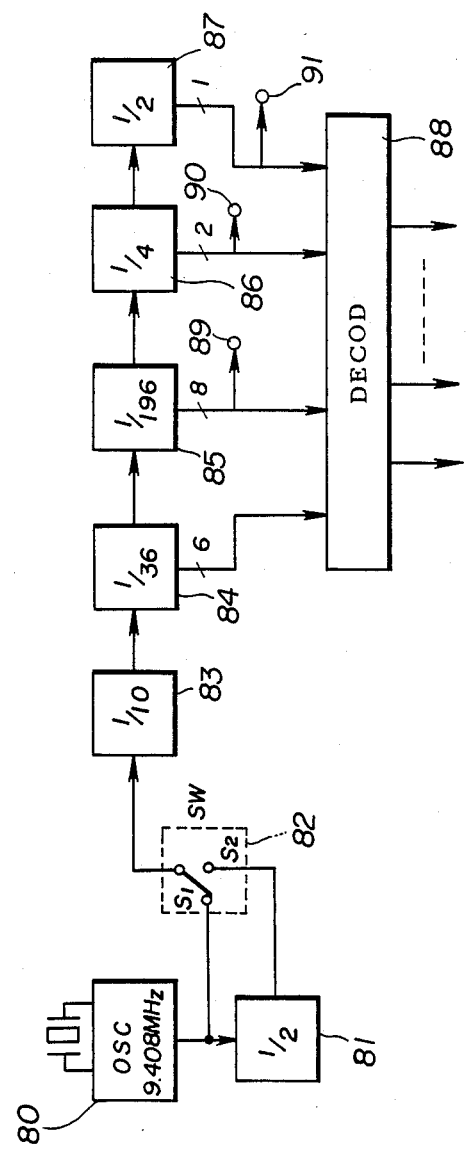
FIG. 21 is a system circuit diagram showing an embodiment of a timing control circuit in the block system shown in FIG. 1.

FIG. 21 shows an embodiment of the timing control circuit 19. The timing control circuit 19 comprises an oscillator 80 which generates a signal of 9.408 MHz, a ½ frequency divider 81, a switch 82, a 1/10 frequency divider 83, a 1/36 frequency divider 84, a 1/196 frequency divider 85, a ¼ frequency divider 86, a ½ frequency divider 87 and a decoder 88.

The output signal of the oscillator 80 is supplied to the ½ frequency divider 81 and a terminal S1 of the switch 82. An output signal of the ½ frequency divider 81 is supplied to a terminal S2 of the switch 82, and an output signal of the switch 82 is supplied to the 1/10 frequency divider 83. The switch 82 is connected to the terminal S1 during the recording and reproduction in the standard mode and during the reproduction in the half-speed of the present invention. On the other hand, the switch 82 is connected to the terminal S2 during the recording in the half-speed mode.

The frequency dividers 83 through 87 are successively and serially supplied with the output signal of the switch 82, and output signals of the frequency dividers 84 through 87 are supplied to the decoder 88. The first timing signal shown in FIG. 13(H) is obtained from the third bit of the output signal of the 1/196 frequency divider 85, and is supplied to the tracking reference signal detecting circuit 25 shown in FIG. 1 through a terminal 89. The second timing signal shown in FIG. 13(I) is obtained from the ½ frequency divider 87 through a terminal 91. The drum servo signal shown in FIGS. 14(A) and 15 (A) is obtained from an upper bit of the output signal of the ¼ frequency divider 86 through a terminal 90.

The decoder 88 carries out predetermined signal processings such as AND, OR and delay operations to generate various other timing signals for controlling the operation of the block system shown in FIG. 1.

Figure 22:
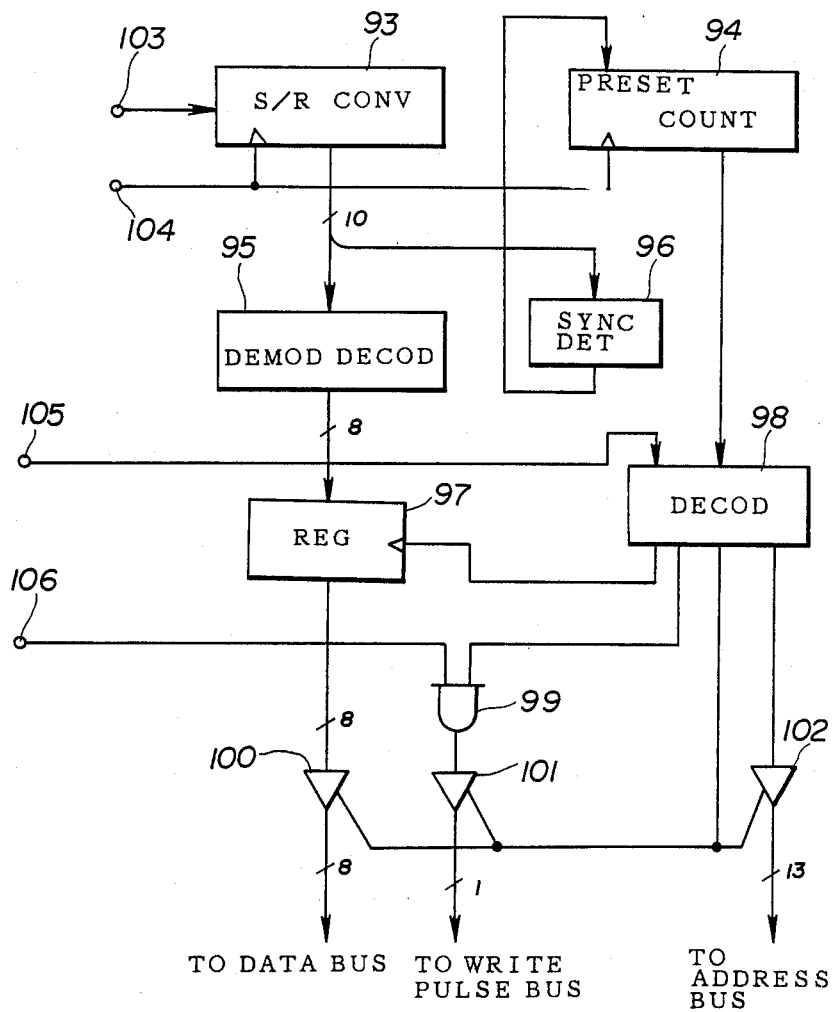
FIG. 22 is a system circuit diagram showing an embodiment of a demodulating circuit in the block system shown in FIG. 1.

FIG. 22 shows an embodiment of the demodulating circuit 27. The demodulating circuit 27 comprises a serial-to-parallel (S/P) converter 93, a counter 94, a demodulating decoder 95, a synchronizing signal detector 96, a register 97, a decoder 98, an AND circuit 99, and tri-state buffers 100 through 102.

The reproduced modulated PCM audio data from the wave equalizing circuit 23 shown in FIG. 1 is applied to a terminal 103 and is supplied to the S/P converter 93. The reproduced clock pulse signal from the PLL circuit 28 is applied to a terminal 104 and is supplied to clock terminals of the S/P converter 93 and the counter 94. An output signal of the S/P converter 93 is supplied to the register 97 through the demodulating decoder 95. The synchronizing signal detector 96 detects the synchronizing signal from the output signal of the S/P converter 93, and supplies an output detection signal to a preset terminal of the counter 94.

The drum servo signal shown in FIGS. 14(A) and 15(A) is applied to a terminal 105 and is supplied to the decoder 98 which is also supplied with a counted output signal of the counter 94. The decoder 98 supplies a clock signal to a clock terminal of the register 97 which stores the data.

An output signal of the register 97 is supplied to a data bus of the memory 29 through the buffer 100. The AND circuit 99 is supplied with an output signal of the decoder 98 and the second timing signal shown in FIG. 13(I) applied to a terminal 106. An output signal of the AND circuit 99 is supplied to a write pulse bus of the memory 29 through the buffer 101. An output signal of the decoder 98 is supplied to an address bus of the memory 29 through the buffer 102. The tri-state buffers 100 through 102 are controlled by an output signal of the decoder 98.

The present invention is not limited to this embodiment, and in FIG. 3, for example, the scans ①, ③ and ⑤ may be made by the rotary head having the gap of the positive azimuth angle and the scans ② and ④ may be made by the rotary having the gap of the negative azimuth angle. In this case, the reproduced signals obtained during the scans ① (or ⑤) and ④ are used. In addition, it may be easily understood from the description made in conjunction with FIGS. 9 and 10 that the reproduced tracking reference signal obtained from the beginning portion of the track during the scan ① or ⑤ and the reproduced tracking reference signal obtained from the ending portion of the track during the scan ④ are used in this case.

In other words, out of the four scans made by the two rotary heads with respect to two mutually adjacent tracks, the two successive scans (② and ③ in the embodiment and ④ and ⑤ or ① in the above described case) in which the reproduced signals are continuously obtained with a large level are selected. In addition, the reproduced tracking reference signals used are obtained from the ending portion of the track during the first of the two successive scans and from the beginning portion of the track during the second of the two successive scans.

Therefore, according to the first embodiment, the frequencies of the tracking reference signal and the modulated PCM audio data in the half-speed mode of the present invention can be made substantially the same as those in the standard mode, since the tape recorded in the conventional half-speed mode is played with the rotational speed of the rotary heads set to two times that at the time of the recording. For this reason, the analog filter for filtering the tracking reference signal, the PLL circuit for reading out the data, the wave equalizing circuit and the like can be used in common in the standard mode and the half-speed mode of the present invention. In addition, the coupling between the rotary heads and the reproducing amplifier through the rotary transformer can be improved, thereby improving the carrier-to-noise ratio of the reproduced signal. Moreover, because the rotational speed of the drum motor is the same for the standard mode and the half-speed mode of the present invention, it is possible to simplify the circuit construction of the drum motor control system. Furthermore, in the half-speed mode of the present invention, the error detecting and correcting operation is carried out at the same speed as that in the standard mode, and the error detecting and correction operation is carried out two times. For this reason, the error detecting and correcting capability is improved compared to the conventional half-speed mode, and it is possible to obtain a reproduced audio signal of a high sound quality.

Figure 23:
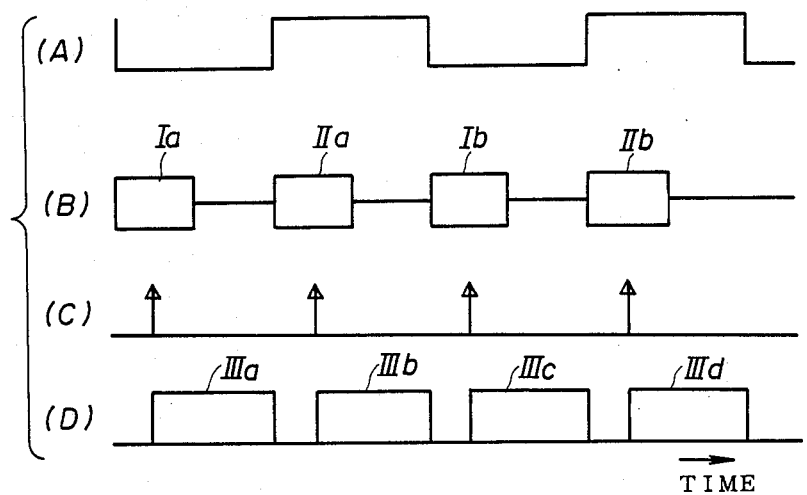
FIGS. 23(A) through 23(D) are timing charts for explaining unused time periods introduced during the error correcting operation.

Next, a description will be given on unused time periods introduced during the error correcting operation by referring to FIGS. 23(A) through 23(D). FIG. 23(A) shows the drum servo signal for controlling the drum motor 11. The drum servo signal has a repetition frequency of approximately 33 Hz and the drum motor 11 undergoes one revolution in one period of the drum servo signal. In the standard mode, reproduced signals Ia and Ib shown in FIG. 23(B) are obtained from one of the two rotary heads and reproduced signals IIa and IIb shown in FIG. 23(B) are obtained from the other of the two rotary heads. These reproduced signals are demodulated and stored in the memory 29. The timing control circuit 19 generates a timing signal (correction start signal) shown in FIG. 23(C) by delaying rising and falling edges of the drum servo signal a predetermined time, and this timing signal is supplied to the error detecting and correcting circuit 30. As a result, the error detecting and correcting circuit 30 detects and corrects the error in each of correcting time periods IIIa through IIId by reading out the respective reproduced signals Ia, IIa, Ib and IIb from the memory 29.

In the half-speed mode, the reproduced signals Ia and IIa shown in FIG. 23(B) are stored in the memory 29 for two revolutions of the rotary drum 14, and the reproduced signals Ib and IIb are not obtained. In addition, the reproduced signal Ia which is subjected to the error correction in the correcting time period IIIa is again subjected to the error correction in the correcting time period IIIc. Similarly, the reproduced signal IIa which is subjected to the error correction in the correcting time period IIIb is again subjected to the error correction in the correcting time period IIId. However, as may be seen from FIG. 23(D), there is a blank time period between the correcting time periods IIIb and IIIc, and also between the correcting time periods IIIc and IIId. In other words, the blank time period is not utilized effectively.

Figure 24:
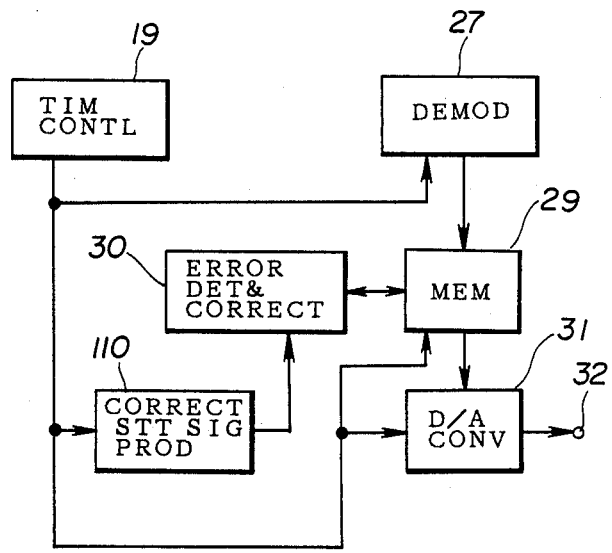
FIG. 24 is a system block diagram showing an essential part of a second embodiment of the rotary head type digital signal reproducing apparatus according to the present invention.

Next, a description will be given on a second embodiment of the rotary head type digital signal reproducing apparatus according to the present invention, wherein the blank time period is effectively utilized. FIG. 24 shows an essential part of the second embodiment, and in FIG. 24, those parts which are the same as those corresponding parts in FIG. 1 are designated by the same reference numerals, and description thereof will be omitted. In the present embodiment, there is provided a correction start signal producing circuit 110. The correction start signal producing circuit 110 receives a timing signal from the timing control circuit 19 and produces a correction start signal which is supplied to the error detecting and correcting circuit 30 for controlling the error correcting timing thereof.

Figure 27:
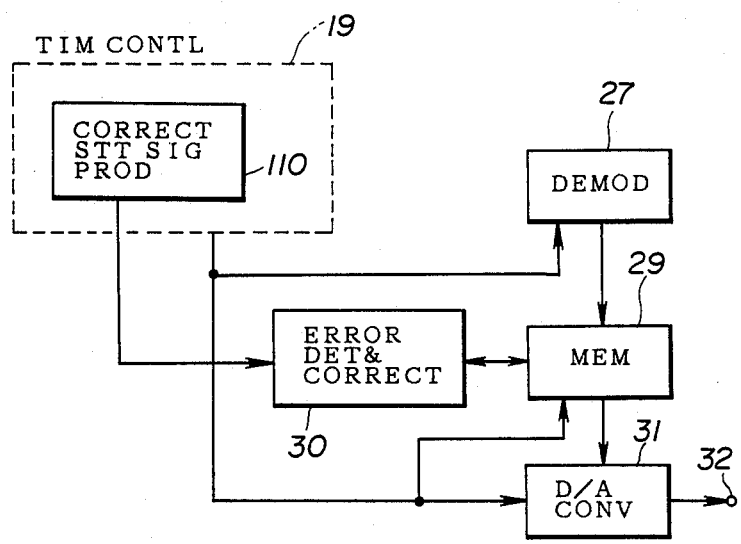
FIG. 27 is a system block diagram showing an essential part of a modification of the second embodiment of the rotary head type digital signal reproducing apparatus according to the present invention.

Although the correction start signal producing circuit 110 is illustrated as being a circuit independent of the timing control circuit 19, the correction start signal producing circuit 110 may be provided within the timing control circuit 19 as shown in FIG. 27 which shows an essential part of a modification of the second embodiment. In FIG. 27, those parts which are the same as those corresponding parts in FIG. 24 are designated by the same reference numerals, and a description thereof will be omitted. Since the operation of the block systems shown in FIGS. 24 and 27 are basically the same, only the description of the block system shown in FIG. 24 will be given hereunder.

Figure 25:
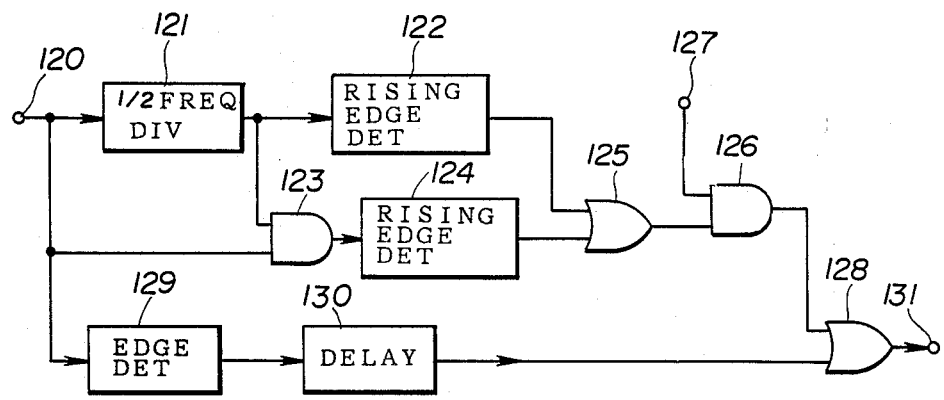
FIG. 25 is a system circuit diagram showing an embodiment of a correction start signal producing circuit in the block system shown in FIG. 24.

FIG. 25 shows an embodiment of the correction start signal producing circuit 110, and FIGS. 26(A) through 26(I) are timing charts for explaining the operation of the correction start signal producing circuit 110 shown in FIG. 25. In FIG. 25, a drum servo signal shown in FIG. 26(A) having a repetition frequency of approximately 33 Hz is applied to an input terminal 120 from the timing control circuit 19. The drum servo signal is frequency-divided by ½ in a ½ frequency divider 121 into a signal shown in FIG. 26(B). This signal from the frequency divider 121 is supplied to a rising edge detector 122 and one input terminal of a 2-input AND circuit 123. The drum servo signal is supplied to the other input terminal of the AND circuit 123. Thus, the AND circuit 123 supplies the drum servo signal to a rising edge detector 124 during the high-level period of the signal shown in FIG. 26(B).

Figure 26:
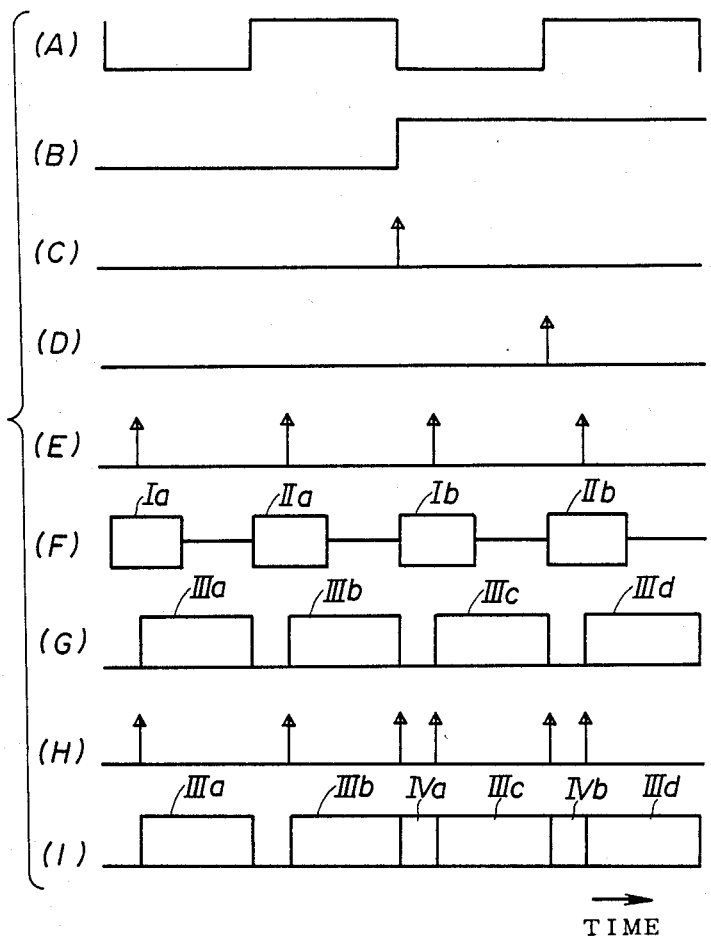
FIGS. 26(A) through 26(I) are timing charts for explaining the operation of the circuit system shown in FIG. 25.

The rising edge detectors 122 and 124 detect the rising edges of the incoming signals, and respectively produce detection pulse signals shown in FIGS. 26(C) and 26(D). The output detection pulse signals of the rising edge detectors 122 and 124 are passed through a 2-input OR circuit 125, and an output pulse signal of the OR circuit 125 is supplied to one input terminal of a 2-input AND circuit 126. A control signal having a low-level in the standard mode and a high level in the half-speed mode is applied to a terminal 127 and is supplied to the other input terminal of the AND circuit 126. As a result, the AND circuit 126 produces the output pulse signal of the OR circuit 125 only during the half-speed mode. An output pulse signal of the AND circuit 126 is supplied to one input terminal of a 2-input OR circuit 128.

An edge detector 129 detects the rising and falling edges of the drum servo signal from the input terminal 120. An output detection pulse signal of the edge detector 129 is delayed by approximately 1.89 msec in a delay circuit 130 into a pulse signal shown in FIG. 26(E). This pulse signal shown in FIG. 26(E) is supplied to the other input terminal of the OR circuit 128. The OR circuit 128 produces a correction start signal and this correction start signal is supplied to the error detecting and correcting circuit 30 shown in FIG. 24 through an output terminal 131.

In the standard mode when all of the reproduced signals Ia, IIa, Ib and IIb are stored in the memory 29 as shown in FIG. 26(F), the correction start signal has a waveform shown in FIG. 26(E) because the low-level control signal is applied to the terminal 127. Hence, as shown in FIG. 26(G), the reproduced signals Ia, IIa, Ib and IIb are subjected to the error correction in the error detecting and correcting circuit 30 during the first correcting time periods IIIa through IIId.

On the other hand, only the reproduced signals Ia and IIa are stored in the memory 29 in the half-speed mode. In this case, the correction start signal has a waveform shown in FIG. 26(H). During the first one revolution of the rotary drum 14, a first error correction is carried out with respect to the reproduced signals Ia and IIa during the first correcting time periods IIIa and IIIb. During the second one revolution of the rotary drum 14, a second error correction is carried out during second correcting time periods IVa and IVb with respect to a portion of the reproduced signals Ia and IIa which have been corrected in the first correcting time periods IIIa and IIIb, and furthermore, a third error correction is carried out during third correcting time periods IIIc and IIId with respect to the reproduced signals Ia and IIa which have been corrected in the first and second correcting time periods IIIa, IIIb, IVa and IVb.

Therefore, the time periods IVa and IVb which were conventionally unused are effectively utilized for the error correction in the present embodiment and the modification thereof. In other words, the error correction is carried out three times (although the error correction is carried out only for a portion of the reproduced signals during the second correcting time periods). As a result, compared to the first embodiment described before, the error correcting capability of the present embodiment is further improved, and it is possible to obtain a reproduced audio signal of a high sound quality.

In the present embodiment and the modification thereof, both the time periods IVa and IVb are utilized for the error correction. However, it is possible to utilize only one of the time periods IVa and IVb.

Further, the present invention is not limited to these embodiments, but various variations and modifications may be made without departing from the scope of the present invention.

What is claimed is:

1. A rotary head type digital signal reproducing apparatus for playing a magnetic tape pre-recorded with a time division multiplexed signal in one of first and second modes, said time division multiplexed signal comprising a pulse code modulated audio data which is obtained by subjecting an original audio signal to a pulse code modulation and a tracking reference signal, said tracking reference signal which amounts to a predetermined time period being time division multiplexed before and after said pulse code modulated audio data which amounts to a certain time period, said time division multiplexed signal being recorded on successive tracks formed obliquely to a longitudinal direction of the magnetic tape by two rotary heads; on the recording in said second mode, a data quantity per unit time, a frequency of said tracking reference signal, a rotational speed of the rotary heads and a tape transport speed of the magnetic tape being one-half those in said first mode, said rotary head type digital signal reproducing apparatus comprising:

reproducing means including two rotary heads for reproducing pre-recorded signals from the magnetic tape;
  means for setting the tape transport speed to a speed identical to that in said second mode and for setting the rotational speed of the rotary heads to a speed identical to that in said first mode when playing the magnetic tape pre-recorded in said second mode;
  tracking control means for controlling tracking of the rotary heads based on reproduced tracking reference signals reproduced by said reproducing means, said reproduced tracking reference signals including out of reproduced signals obtained from said reproducing means during a total of four successive scans made by the rotary heads with respect to two mutually adjacent tracks on the magnetic tape at least a reproduced tracking reference signal obtained in an ending portion of a first scan and a reproduced tracking reference signal obtained in a beginning portion of a second scan immediately after said first scan, said first and second scans being successive scans in which a large reproduced output is obtainable by the rotary heads from said two mutually adjacent tracks; and
  decoding means for decoding the reproduced signals obtained from said reproducing means into the original audio signal based on a reproduced pulse code modulated audio data reproduced from one of said two mutually adjacent tracks during said first scan and a reproduced pulse code modulated audio data reproduced from the other of said two mutually adjacent tracks during said second scan.

2. A rotary head type digital signal reproducing apparatus as claimed in claim 1 in which said decoding means comprises memory means for temporarily storing the reproduced pulse code modulated audio data including parity codes, and error detecting and correcting means for detecting and correcting errors in the reproduced signals by carrying out an error detecting and correcting operation on the pulse code modulated audio data including parity codes stored in said memory means, said error detecting and correcting operation being carried out at the same speed when playing the magnetic tape pre-recorded in said first mode and the magnetic tape pre-recorded in said second mode, said error detecting and correcting operation being repeated two times when playing the magnetic tape pre-recorded in said second mode.

3. A rotary head type digital signal reproducing apparatus as claimed in claim 2 in which said memory means comprises a memory region for storing an error flag data indicative of whether or not an error is correctable, said error detecting and correcting means storing the error flag data in the memory region of said memory means only during a latter one of the error detecting and correcting operations which are repeated two times.

4. A rotary head type digital signal reproducing apparatus as claimed in claim 1 in which said decoding means comprises memory means for temporarily storing the reproduced pulse code modulated audio data including parity codes, and error detecting and correcting means for detecting and correcting errors in the reproduced signals by carrying out an error detecting and correcting operation on the pulse code modulated audio data including parity codes stored in said memory means, said error detecting and correcting operation being carried out at the same speed when playing the magnetic tape pre-recorded in said first mode and the magnetic tape pre-recorded in said second mode, said error correcting operation being carried out within first correcting time periods during a first of two successive revolutions of the rotary heads and also within second correcting time periods during a latter of the two successive revolutions when playing the magnetic tape pre-recorded in said second mode, said first correcting time periods respectively starting a predetermined time after a beginning of a scan to an end of the scan made by a corresponding one of the two rotary heads during said first revolution, said second correcting time periods respectively starting a predetermined time after a beginning of a scan to an end of the scan made by a corresponding one of the two rotary heads during said second revolution.

5. A rotary head type digital signal reproducing apparatus as claimed in claim 4 in which said error correcting operation is carried out also within at least one of third correcting time periods, one of said third correcting time periods being defined by an end of one of said first correcting time periods corresponding to an end of said first revolution and a start of one of said second correcting time periods corresponding to the predetermined time after a beginning of said second revolution, the other of said third correcting time periods being defined by an end of said one of the second correcting time periods and a start of the other of said second correcting time periods.

* * * * *